United States Patent [19]

Caveney et al.

[11] 3,872,547

[45] Mar. 25, 1975

[54] ONE-PIECE CABLE TIE

[75] Inventors: Jack E. Caveney, Chicago; Roy A. Moody, Flossmoor, both of Ill.

[73] Assignee: Panduit Corp., Tinley Park, Ill.

[22] Filed: Aug. 25, 1970

[21] Appl. No.: 66,770

[52] U.S. Cl............................................ 24/16 PB
[51] Int. Cl............................................ B65d 63/00
[58] Field of Search....... 24/30.5 PB, 73 SA, 73 PB, 24/16 PB, 17 A; 248/74 PB

[56] References Cited
UNITED STATES PATENTS

| | | | |
|---|---|---|---|
| 2,979,794 | 4/1961 | Bartolo | 248/74 PB X |
| 3,009,220 | 11/1961 | Fein | 24/16 PB |
| 3,103,666 | 9/1963 | Bone | 24/150 FP UX |
| 3,127,648 | 4/1964 | Emery | 24/16 PB |
| 3,144,695 | 8/1964 | Budwig | 24/73 SA UX |
| 3,147,522 | 9/1964 | Schumm | 24/16 PB |
| 3,214,808 | 11/1965 | Litwin | 24/16 PB |
| 3,285,404 | 11/1966 | Spinney | 24/16 PB UX |
| 3,368,247 | 2/1968 | Orban | 24/16 PB |
| 3,471,109 | 10/1969 | Meyer | 24/73 SA X |
| 3,484,905 | 12/1969 | Eberhardt | 24/16 PB |
| 3,486,201 | 12/1969 | Bourne | 24/16 PB |
| 3,542,321 | 11/1970 | Kahabka | 24/16 PB X |
| 3,550,219 | 12/1970 | Van Buren | 24/73 SA |
| 3,588,962 | 6/1971 | Feldberg | 24/16 PB |

FOREIGN PATENTS OR APPLICATIONS

| | | | |
|---|---|---|---|
| 70,048 | 10/1958 | France | 24/16 PB |
| 486,139 | 3/1970 | Switzerland | 24/16 PB |

Primary Examiner—Donald A. Griffin
Attorney, Agent, or Firm—Prangley, Dithmar, Vogel, Sandler & Stotland

[57] ABSTRACT

A one-piece cable tie including a flexible strap having a row of teeth thereon and a frame integral with one end thereof and with an entry surface and an exit surface and a strap-receiving opening therethrough, a pawl hingedly mounted on the frame in the opening with a resilient web interconnecting the sides of the pawl and the frame and having two teeth engageable with the strap teeth and in the tensioned condition shifting the pawl to grip the strap against the frame, stop members on the pawl engaging the frame to limit shifting movement of the pawl under ultimate-load conditions, the pawl tooth disposed nearest the entry surface extending toward the opposite frame wall further than the other pawl tooth so as to engage the strap teeth upon strap insertion and to protect the other pawl tooth, the outer free end of the strap being provided with spaced apart ridges along the edges thereof and disposed outwardly with respect to the pawl teeth to facilitate insertion of the strap into the frame and past the pawl and engagement with application tools; the rear surface of the pawl is rounded and the adjacent frame wall is likewise rounded, and the inner side walls of the frame may have ribs thereon to facilitate withdrawal from the mold, and the mold cavities for the cable ties are filled through the tip of the free end of the strap so that any irregularities occur thereat; a cable tie is also disclosed having a release tab thereon for manual release after tensioning.

41 Claims, 28 Drawing Figures

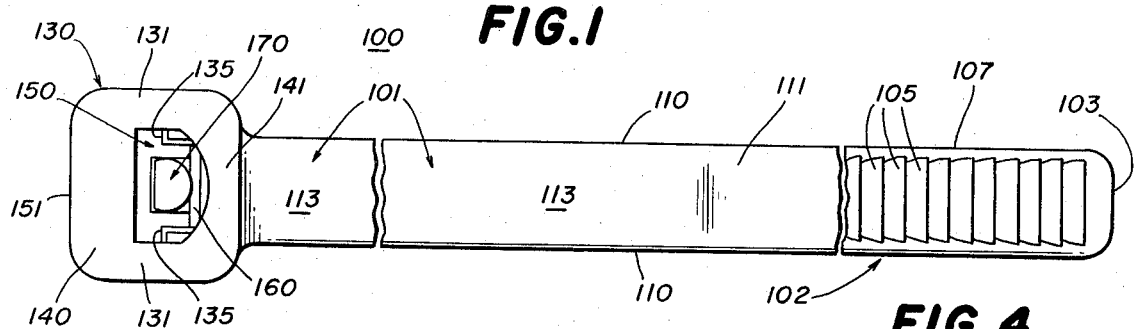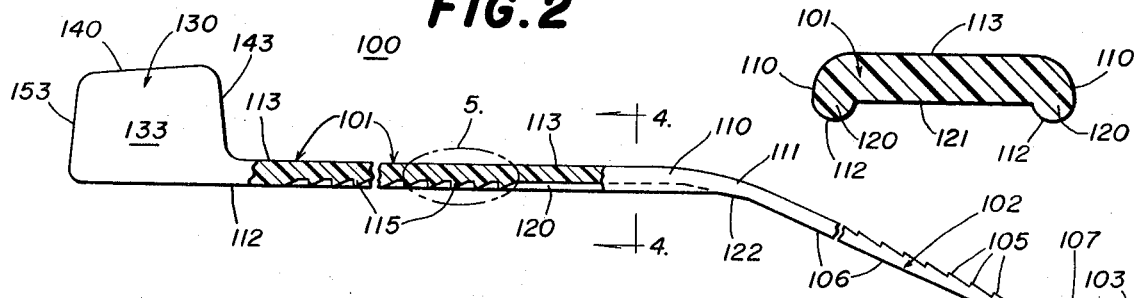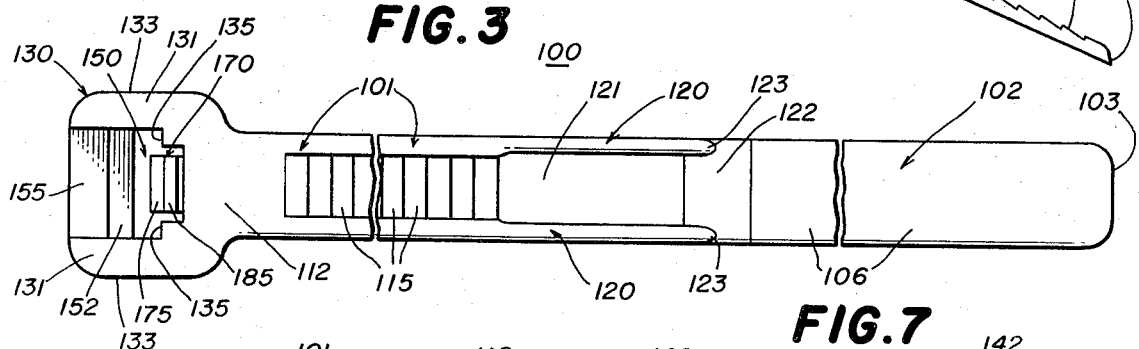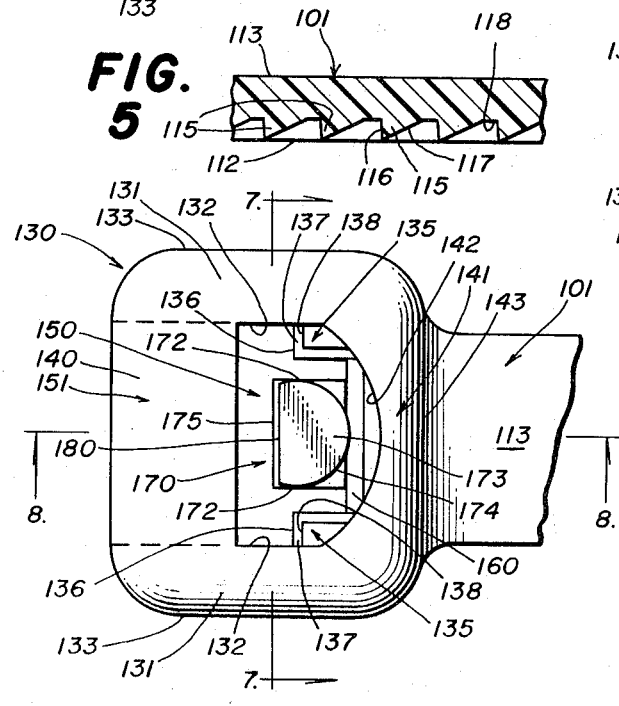

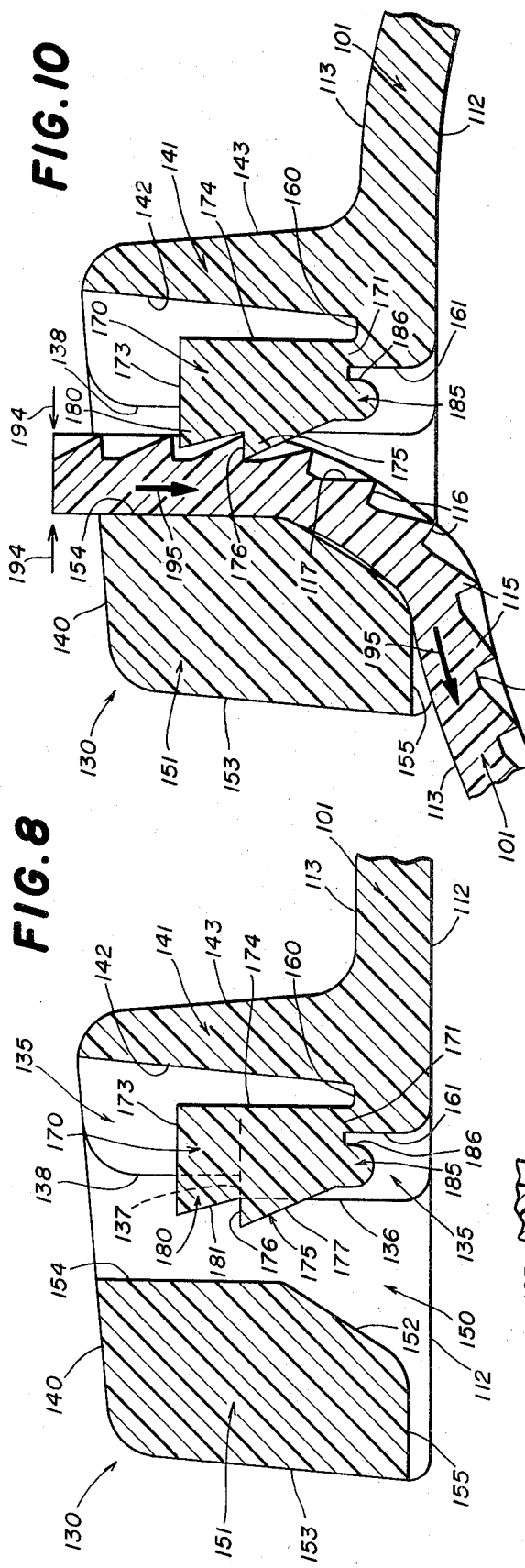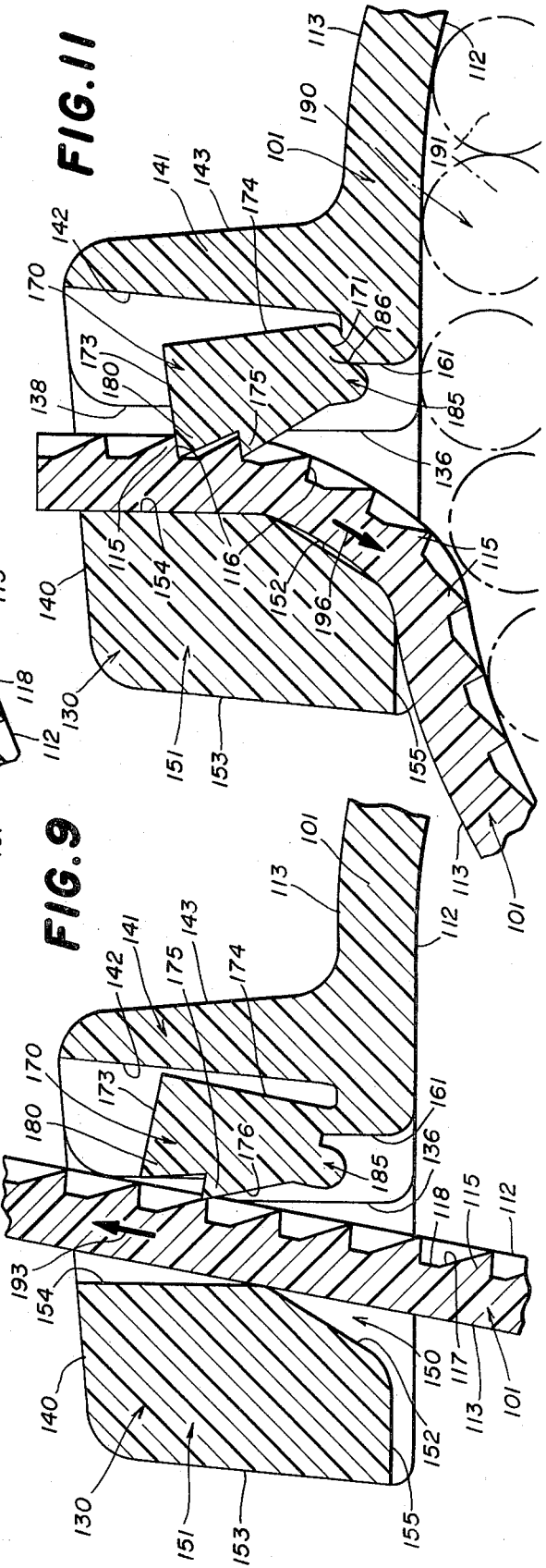

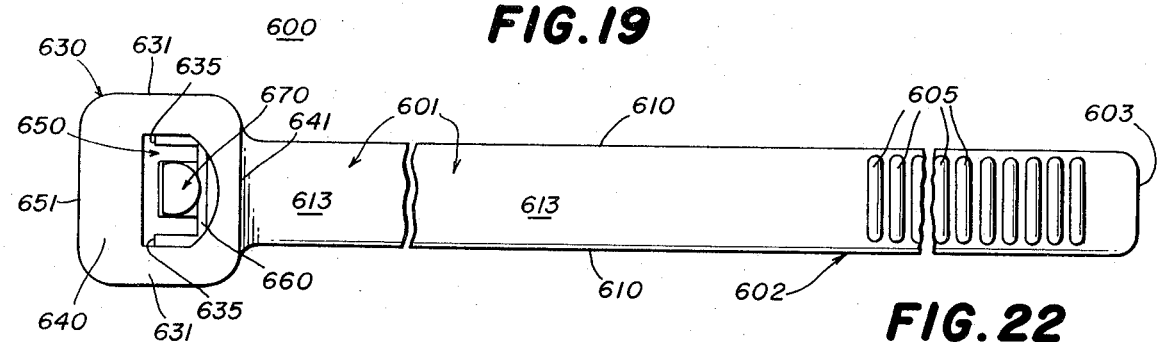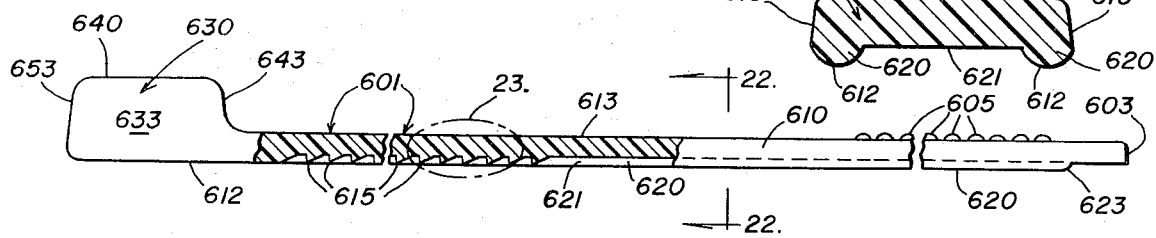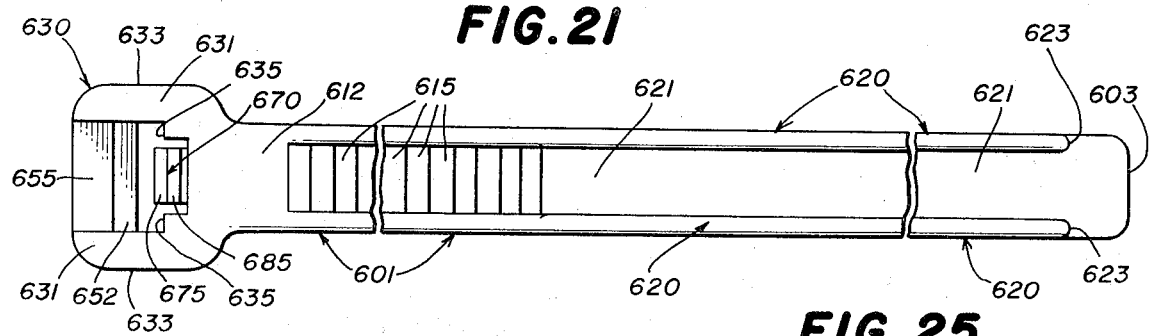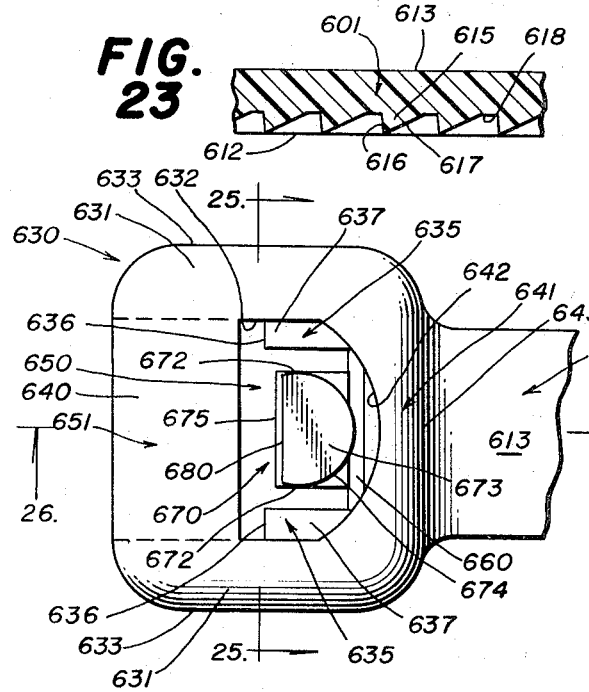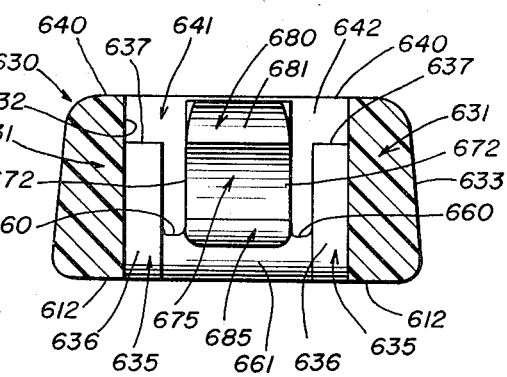

ONE-PIECE CABLE TIE

The present invention is directed to an integral one-piece cable tie to be tensioned about a bundle of wires and the like, certain of which cable ties can be applied by using tools and certain of which cable ties can be applied by hand.

It is an important object of the invention to provide a cable tie to be tensioned about a bundle of wires and the like, comprising an elongated flexible strap having a row of first abutments on one surface thereof, a frame on one end of the strap and having an abutment wall and an end wall and an entry surface and an exit surface and an opening therethrough for receiving the other end of the strap, a pawl disposed within the frame in the strap-receiving opening and a hinge connecting the frame and the end of the pawl disposed toward the exit surface, the pawl being shiftable between an as-molded position disposed away from the abutment wall and a strap-locking position and an ultimate-load position disposed toward the abutment wall, at least one second abutment on the pawl disposed toward the abutment wall and shaped to engage the row of first abutments of the strap, and a stop member on the pawl extending toward the entry surface and spaced from the frame in the as-molded position of the pawl and abutting against the frame in the ultimate-load position of the pawl to limit the shifting of the pawl under tension.

Another object of the invention is to provide a cable tie of the type set forth wherein the pawl has at least two teeth thereon, the pawl tooth disposed toward the entry surface being positioned in the as-molded position of the pawl closer to the strap-bearing surface than the tooth disposed toward the exit surface, whereby upon insertion of the strap into the frame, the pawl tooth disposed toward the entry surface is the only pawl tooth engaged by the strap and after tensioning and upon release of the strap the pawl tooth toward the exit surface is moved into engagement with the strap.

Another object of the invention is to provide a cable tie of the type set forth wherein the outer end portion of the strap has a thickness substantially equal to that of the distance between the roots of the strap teeth and the other surface of the strap, and two ridges are disposed respectively along the longitudinal edges of the one strap surface and extend from one adjacent to the strap tooth disposed away from the frame to a point adjacent to the outer end portion of the strap, the ridges having a thickness substantially equal to the crest-to-root thickness of the strap teeth, whereby upon insertion of the outer end of the strap into the frame, the ridges are disposed toward the pawl on the opposite sides thereof and engage portions of the frame to hold the strap out of engagement with the pawl teeth to facilitate the insertion of the outer portion of the strap through the frame and to facilitate gripping of the strap by application tools.

Another object of the invention is to provide a cable tie of the type set forth wherein the rear wall of the frame is substantially rounded in a direction parallel to the axis of the strap opening and the rear of the pawl is likewise substantially rounded and disposed toward the rounded frame wall, thereby to facilitate molding of the frame and the pawl.

Another object of the invention is to provide an anti-rotation member on the pawl extending toward the exit surface to contact the strap in the ultimate-load position of the pawl to limit shifting and rotation of the pawl.

Another object of the invention is to provide a cable tie of the type set forth wherein the frame has therein a rib on each of the side walls and extending therefrom into the strap-receiving opening to facilitate withdrawal of the cable tie from the mold therefor.

Another object of the invention is to provide a cable tie of the type set forth wherein a stop member is provided on one of the facing rear walls of the pawl and frame, whereby further to limit shifting and rotation of the pawl under tension in the ultimate-load position thereof.

Another object of the invention is to provide a molded cable tie wherein the mold for forming the cable tie is filled in that portion forming the outermost free end of the strap, so that any irregularity resulting from the connection point used during filling of the mold for molding the cable tie is on that portion of the strap which is normally cut off and disposed of after application of the cable tie to a wire bundle and the like.

Yet another object of the invention is to provide a cable tie of the type set forth which can be readily applied about a bundle of wires and the like by hand, and including a frame of reduced dimensions and a strap end particularly adapted for engagement by the hand of the user.

Yet another object of the invention is to provide a cable tie of the type set forth wherein a resilient web interconnects the sides of the pawl and the adjacent sides of the frame.

A further object of the invention is to provide a cable tie of the type set forth wherein the pawl has a release tab thereon extending beyond the frame for manual engagement by a user so as to permit manual release of the cable tie after tensioning thereof about a bundle of wires and the like.

Further features of the invention pertain to the particular arrangement of the parts of the cable tie, whereby the above outlined and additional operating features thereof are attained.

The invention, both as to its organization and method of operation, together with further objects and advantages thereof, will best be understood by reference to the following specification taken in connection with the accompany drawings, in which:

FIG. 1 is a plan view with certain portions broken away of an integral one-piece cable tie made in accordance with and embodying the principles of the present invention;

FIG. 2 is a side elevational view with certain parts broken away of the cable tie of FIG. 1;

FIG. 3 is a plan view with certain portions broken away of the reverse side of the cable tie of FIGS. 1 and 2;

FIG. 4 is an enlarged view in cross section of the cable tie of FIG. 2 along the Line 4—4 thereof;

FIG. 5 is an enlarged fragmentary view in cross section of the portion of FIG. 2 within the enclosure designated by the numeral 5;

FIG. 6 is enlarged fragmentary plan view of the frame forming a part of the cable tie of FIGS. 1-3;

FIG. 7 is a view in vertical section along the line 7—7 of FIG. 6;

FIG. 8 is a further enlarged fragmentary view in vertical section along the line 8—8 of FIG. 6;

FIG. 9 is a view similar to FIG. 8 illustrating the engagement between the strap teeth and the pawl teeth during strap tightening;

FIG. 10 is a view similar to FIGS. 8 and 9 illustrating the positions of the parts at the end of normal strap tensioning and after cut off of the portion of the strap extending beyond the frame;

FIG. 11 is a view similar to FIG. 8 showing the parts when a force is applied to the strap in a strap-withdrawal direction to place the parts in the ultimate-load positions thereof;

Figure 16:
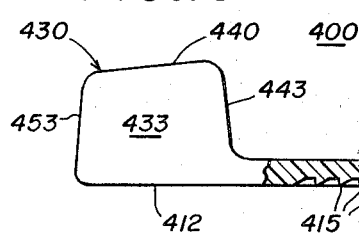
Figure 17:
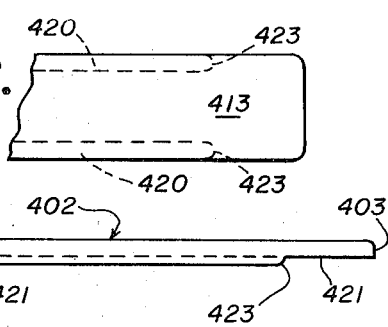
Figure 18:
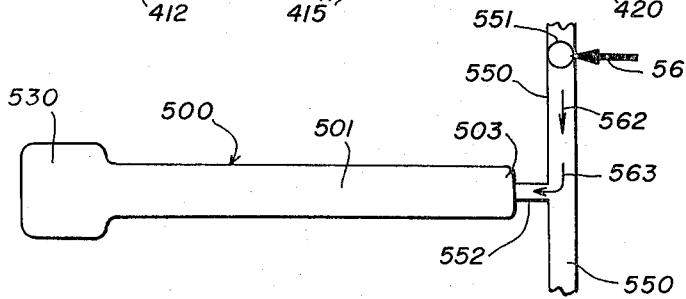
Figure 26:
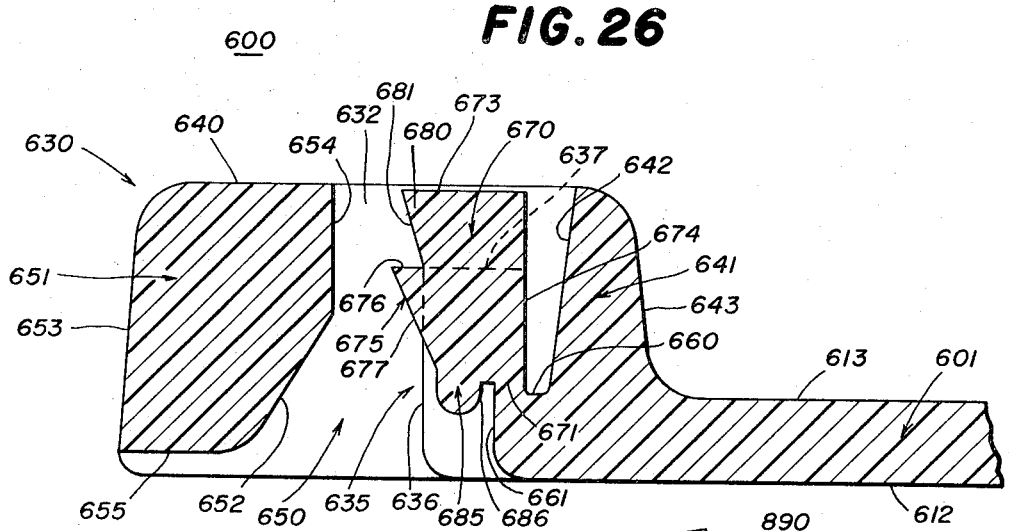
Figure 27:
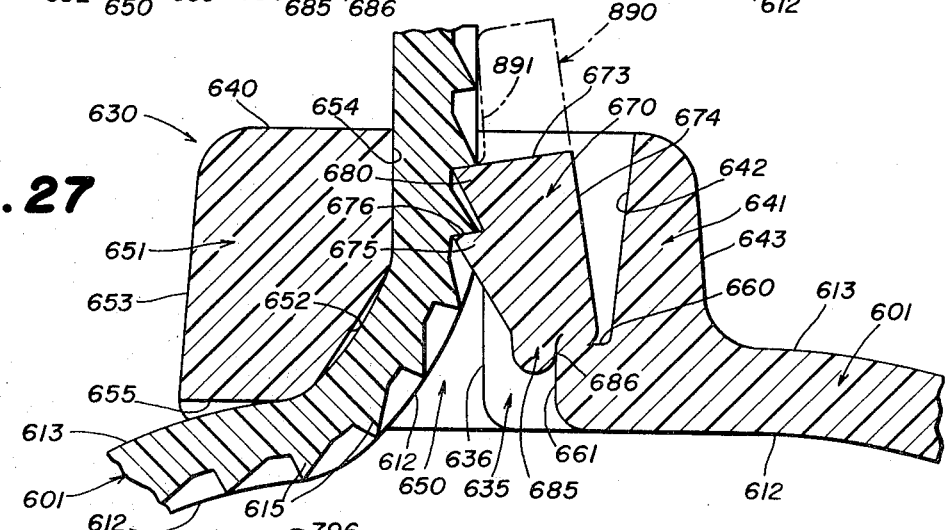
Figure 28:
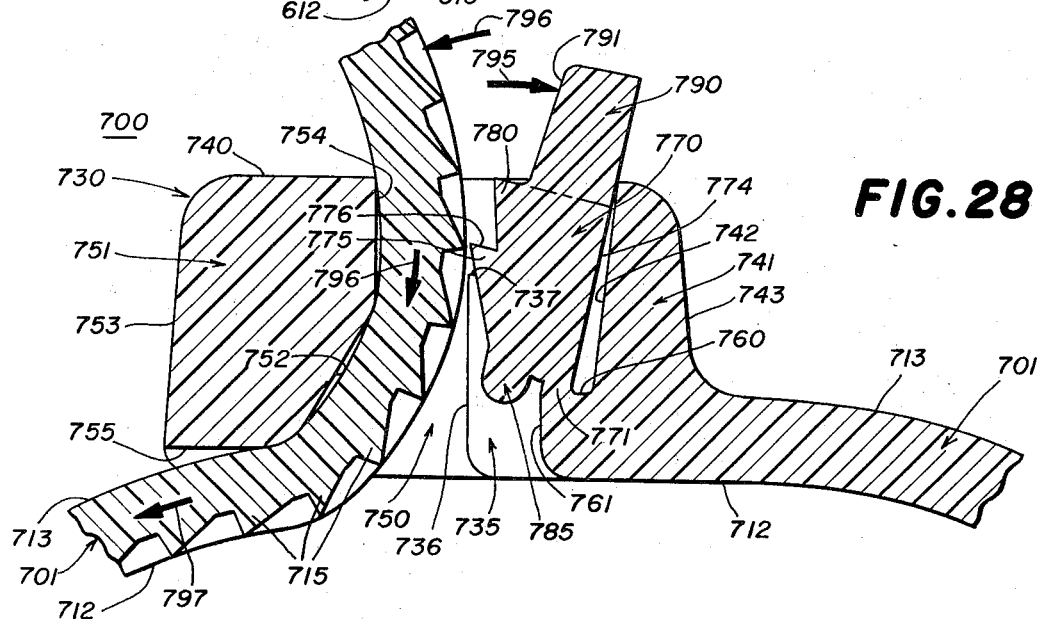

FIGS. 16 and 17 of the drawings illustrate a third modification of the cable tie of FIGS. 1 to 11;

FIG. 18 is a diagrammatic view illustrating the manner of molding the cable tie of the present invention by filling the mold therefor through the portion which would correspond to the outermost free end of the strap in the molded cable tie;

FIG. 19 is a plan view with certain of the portions broken away of yet another embodiment of the integral one-piece cable tie made in accordance with and embodying the principles of the present invention, this cable tie being particularly adapted to be tensioned by hand without the use of any tool;

FIG. 20 is a side elevational view with certain parts broken away of the cable of FIG. 19;

FIG. 21 is a plan view with certain portions broken away of the reverse side of the cable tie of FIGS. 19 and 20;

FIG. 22 is an enlarged view in cross section through the cable tie of FIG. 20 along the Line 22—22 thereof;

FIG. 23 is an enlarged fragmentary view in cross section of the portion of FIG. 20 within the enclosure designated by the reference numeral 23;

FIG. 24 is an enlarged fragmentary plan view of the frame forming a part of the cable tie of FIGS. 19 to 21;

FIG. 25 is a view in vertical section along the Line 25—25 of FIG. 24;

FIG. 26 is a further enlarged fragmentary view in vertical section along the Line 26—26 of FIG. 24;

FIG. 27 is a view similar to FIG. 26 and illustrating the position of the parts after the tensioning of the cable tie of FIGS. 19 to 26 about a bundle of wires and the like; and FIG. 28 is a fragmentary view in vertical section similar to FIG. 26 and 27 and illustrating the provision of a manual release tab on the pawl to permit manual release of the cable tie after tensioning thereof.

Referring to FIGS. 1 to 3 of the drawings, there is shown a first preferred embodiment of an integral one-piece cable tie made in accordance with and embodying the principles of the present invention.

The cable tie 100 includes generally a strap 101 carrying on one end thereof a frame or head 130 having a strap-receiving opening or throat 150 in which is disposed a pawl 170. The cable tie 100 is typically used to bind a bundle 190 formed of a plurality of wires 191 and accordingly the cable tie 100 has been illustrated in this end use in FIG. 11. However, it will be appreciated that the cable tie 100 can be advantageously used to bind other objects in a like manner.

A preferred material of construction of the cable tie 100 is a suitable synthetic organic plastic resin, the preferred resin being one of the polyamide resins; the resin must be sufficiently flexible to accommodate the deformation of the several parts of the cable tie 100 as illustrated throughout the drawings. It is an important object of the invention that each of the parts of the cable tie 100 is integral with the adjacent parts thereof, whereby the cable tie 100 is truly one-piece and formed integral throughout.

The strap 101 is elongated and flexible and includes a tip or end portion 102 which extends downwardly as viewed in FIG. 2 with respect to the remaining portion of the strap 101 as molded, the tip 102 having an outer end 103 which is slightly rounded and beveled as illustrated. The end portion 102 further has on the upper surface thereof as viewed in FIG. 2 a plurality of serrations 105 adapted to be grasped manually by a user to assist in initial installation of the cable tie 100 about a bundle 190. As illustrated, the end portion 102 is provided with an inner or bundle-engaging surface 106 and an outer surface 107.

The strap 101 further includes a pair of longitudinally extending strap sides 110 which extend the length of the strap 101, and there are provided on the portions of strap 101 disposed between the juncture 111 with the end portion 102 and the juncture with the frame 130 an inner or bundle-engaging surface 112 and an outer surface 113. Disposed in the surface 112 is a series of abutments in the form of a row of teeth 115 (see FIG. 5 also), the teeth 115 being disposed in a recessed position with respect to the surface 112 and extending laterally of the strap 101 and having a width slightly less than the width of the surface 112, whereby to be confined completely within the body of the strap 101. As illustrated, each of the teeth 115 has a shorter side 116 that is inclined downwardly and to the right as viewed in FIG. 5, i.e., away from the frame 130 toward the inner surface 112, the inclination of the side 116 being a small acute angle with respect to a plane arranged transversely of the strap 101 and disposed perpendicular to the surface 112, the small acute angle in an illustrative example of the cable tie 100 being about 4°. Each of the teeth 115 also has a longer inclined side 117, the teeth being separated one from the other by flat surfaces 118 disposed substantially parallel to the surfaces 112 and 113 as molded.

The teeth 115 terminate a substantial distance away from the juncture 111 with the end portion 102 and a recessed portion of the underside of the strap as viewed in FIG. 2 providing an essentially flat surface 121 disposed between a pair of longitudinally extending ridges 120 disposed along the sides of the strap 102 and terminating in a transition surface 122 bridging the surfaces 126 and 121, the ridges 120 terminating in rounded ends 123. As illustrated, the ridges 120 have the inner facing surfaces thereof disposed apart a distance slightly greater than the width of the teeth 115, while the lowermost surfaces of the ridges 120 as viewed in FIG. 4 actually lie in the same plane as the strap inner surface 112. The thickness of the ridges 120, i.e., the distance between the surfaces 112 and 121, is essentially equal to the crest-to-root dimension of the teeth 115, and the thickness of the strap between the ridges 120, i.e., the distance between the surfaces 112 and 121 is equal to the distance between the flat surfaces 118 and the surface 113.

The frame 130 is integral with the strap 101 and comprises a pair of side walls or members 131, a rear wall or member 141 and a front wall or member 151. As may be best seen in FIG. 7, the side walls 131 are laterally spaced apart and include inner surfaces 132 that extend the full height of the frame 130 and are disposed essentially parallel to one another, the inner surfaces 132 more specifically extending from the inner surface 112 which serves as an entry surface for the frame 130 to an exit surface 140 on the top of the frame 130 as viewed in FIG. 7. The inner surfaces 132 further are spaced apart a distance greater than the distance between the strap sides 110, whereby the strap 101 may be received between the inner surfaces 132, all as will be explained more fully hereinafter. Each of the side walls 130 further includes an outer surface 133 that extends from the entry surface 112 to the exit surface 140.

Provided on each of the side walls 131 is a rail generally designated by the numeral 135, the rails 135 extending laterally inwardly toward one another. As illustrated, each of the rails 135 is in two sections, the lower section providing a guide surface 136 disposed essentially normal to the inner surface 132 and essentially normal to the entry surface 112. The lower guide surfaces 136 each terminate in a surface 137 disposed normal to the surfaces 136 and essentially parallel to the entry surface 112. Set back from and with respect to the lower guide surfaces 136 are upper guide surfaces 138 disposed parallel to the lower guide surfaces 136 and essentially normal to the entry surface 112. The rails 135 serve to guide the strap 101 along a predetermined path through the frame 130, as will be explained more fully hereinafter.

The rear wall or end wall 141 includes an inner surface 142 and an outer surface 143, the inner surface 142 being rounded as best seen in FIG. 6 and sloping downwardly from the exit surface 140 toward the entry surface 112 and toward the pawl 170 and away from the outer surface 143, whereby the rear wall 141 is thicker at the bottom thereof than at the top thereof, all as illustrated in FIG. 8. The rails 135 merge into the rear wall 141 and the strap 121 is joined to the frame 130 at the lower and thicker portion of the rear wall 141.

The front wall or abutment wall 151 has an inner surface which includes a lower inclined surface 152 and an upper surface 154, both of which surfaces are spaced from the rear wall 141 in the direction opposite to the strap 101. The inclined surface 152 is inclined at an angle of about 58° with respect to the entry surface 112 toward the exit surface 140 and with respect to the longitudinal axis of the strap 101 as molded. The surface 154 on the other hand is disposed essentially normal to both the entry surface 112 and the longitudinal axis of the axis 101 as molded. The abutment wall 151 and the pawl 170 cooperate to provide therebetween a strap-receiving opening 150 that has the longitudinal axis thereof generally normal to the entry surface 112 and the longitudinal axis of the strap 101 as molded. The front wall 151 also has an outer surface 153 that extends downwardly from the exit surface 140 and terminates a short distance away from the entry surface 112 and joins thereat a guide surface 155 which connects the inner surface 152 and the outer surface 153. More specifically, the guide surfaces 155 is spaced from the entry surface 112 and together with the inner surfaces 132 of the side walls 131 defines a strap-receiving channel in the frame 130. The channel thus provided in the frame 130 and beneath the front wall 151 permits the frame 130 to lie more closely against the associated bundle when the parts are in their tensioned condition as illustrated in FIG. 11.

It is noted that the exit surface 140 is inclined with respect to the entry surface 112 and the longitudinal axis of the strap 101 as molded, and more specifically slopes downwardly toward the entry surface 112 away from the strap 101.

Extending between the rails 135 adjacent to the lower portion of the rear wall 141 is a ledge 160, the ledge 160 being essentially rectangular and directed toward the front wall 151 and disposed substantially parallel to the entry surface 112 and to the longitudinal axis of the strap 101 as molded. A surface 161 interconnects the entry surface 112 and the central portion of the ledge 160 disposed toward the front wall 151.

Mounted within the strap-receiving opening 150 in the frame 130 is the pawl 170, the pawl 170 being connected to and mounted on the ledge 160 by means of a hinge 171, the hinge 171 being essentially rectangular in cross section. The pawl 170 has a pair of side surfaces 172 disposed substantially parallel to each other (see FIGS. 6 and 7), the side surfaces 172 being spaced apart a distance slightly less than the transverse dimensions of the teeth 115 on the strap 101. The pawl 170 also has a top surface 173 (see FIG. 8) that is disposed substantially parallel to the entry surface 112 and the axis of the strap 101 as molded. There also is provided a rear surface 174 which is formed as the arc of a cylinder, the rear surface 174 being disposed toward the rounded surface 142 on the rear wall 141. Two abutments in the form of teeth 175 and 180 are provided on the surface of the pawl 170 disposed toward the front wall 151. The lower tooth 175 has a shorter side 176 disposed parallel to the top surface 173 and having a longer inclined side 177. The upper tooth 180 utilizes the top surface 173 as one of the sides thereof and also has an inclined side 181 that merges downwardly into the side 176 of the tooth 175.

Referring to FIGS. 6 and 8, it will be seen that the crest of the tooth 175 is disposed forwardly or to the left as viewed in FIG. 8 toward the opening abutment surface 154 with respect to the upper tooth 180, i.e., the crests of the teeth 175 and 180 lie in a plane that is inclined upwardly away from the opposed surface 154 in the as-molded position of the pawl 170 illustrated in FIG. 8. The crest-to-crest distance of the pawl teeth 175 and 180 is slightly less than the crest-to-crest distance of the strap teeth 115, whereby to insure that all of the teeth on the pawl 170 are positioned to engage teeth 115 on the strap 101, all as will be explained more fully hereinafter.

Disposed on the pawl 170 below the tooth 175 and forwardly and respect to the hinge 171 is a stop member 185. Referring to FIG. 7, it will be seen that the stop member 185 extends the entire width of the pawl 170, and referring to FIG. 8, it will be seen that the stop member 185 is essentially semi-cylindrical in shape and extends downwardly from the pawl 170 below the tooth 175 and in front of the inner surface 161. Disposed toward the surface 161 is an abutment surface 186 on the stop member 185, which abutment surface 186 is adapted to move toward and abut against the inner surface 161 when the cable tie 100 is under tension, whereby the stop member 185 serves to limit the pivoting and shifting of the pawl 170 under tension, all as will be explained more fully hereinafter.

In use, the cable tie 100 is encircled about a bundle 190 of wires 191 as illustrated in FIG. 11. Prior to such encirclement of the bundle 190, the frame 130 and the several parts associated therewith including the pawl 170 are in the positions shown in FIG. 8, i.e., in the as-molded condition thereof. It is noted that the crest of the tooth 175 is disposed forwardly or to the left with respect to the crest of the tooth 180, and the abutment surface 186 is positioned from the inner surface 161 a short distance, which short distance is less than the closest distance between the rear surface 174 of the pawl 170 and the inner surface 142 of the rear wall 141 adjacent to the ledge 160.

The first step in applying the cable tie 100 about the bundle 190 is to insert the end portion 102 in the frame 130. It will be noted that the thickness of the end portion 102 is essentially equal to the distance between the surfaces 113 and 121 and is essentially equal to the distance between the abutment wall 154 and the crest of the pawl tooth 175, whereby the pawl tooth 175 is essentially undisturbed when the end portion 102 is inserted. After the end portion 102 is passed through the frame 130, the outer serrations 105 are grasped by the user to pull the strap through the frame until eventually the ridges 120 engage the rails 135 and specifically the lower guide surfaces 136 thereof. In passing, it is noted that the lower guide surfaces 136 of the rails 135 are positioned toward the abutment surface 154 as far as possible and essentially these surfaces 136 and 154 are spaced apart the thickness of the strap 101 in the area of the ridges 120 and the teeth 115.

Further movement of the strap 101 through the frame 140 will bring the strap teeth 115 into engagement with the lower pawl tooth 175 as illustrated in FIG. 9. More specifically, initial engagement between the strap 101 and the pawl 170 is between the endmost one of the strap teeth 115 and the lower pawl tooth 175, such engagement pivoting the pawl 170 in a clockwise direction and to the position illustrated in FIG. 9. During further tightening movement of the strap 101, i.e., movement in the direction of the arrow 193 in FIG. 9, the strap teeth 115 successively engage the pawl tooth 175, thereby to hold the pawl 170 generally in the position illustrated in FIG. 9 during movement of this position of the strap 101 through the frame 130. It is pointed out that the upper pawl tooth 180 is not engaged by the strap 101, but is held out of engagement therewith due to the fact that the pawl tooth 175 extends toward the abutment surface 154 farther than does the pawl tooth 180. Preferably a hand tool such as illustrated in Caveney and Moody U.S. Pat. No. 3,169,560, granted Feb. 16, 1965, or a power tool such as that illustrated in the Caveney and Moody U.S. Pat. No. 3,256,680, granted June 8, 1966, is utilized to tighten the strap 101 about the bundle 190, both of which tools automatically at the end of the tightening operation, sever the strap 101 at a point disposed beyond the exit surface 140 of the frame 130, such as illustrated by the arrows 194 in FIG. 10.

Immediately after severing of the strap 101, the tension in the portion of the strap 101 about the bundle 190 tends to withdraw the strap 101 from the frame 130 in the direction of the arrow 195, i.e., in a retrograde or strap-withdrawal direction. During such movement of the strap 101 relative to the frame 130, the strap tooth 115 disposed immediately above the pawl tooth 175 engages the pawl tooth 175 and begins to shift and pivot the pawl 170 in a counterclockwise direction from the position illustrated in FIG. 9 toward that illustrated in FIG. 10. As the retrograde movement of the strap 101 continues, the strap tooth 115 immediately above the pawl tooth 180 moves downwardly but does not engage the pawl tooth 180. Ultimately the parts arrive in the position illustrated in FIG. 10, these being the normal strap-locking positions of the parts.

With the parts in this condition, the pawl tooth 180 is not in engagement with a strap tooth 115, but the pawl tooth 175 is in firm engagement with the strap tooth 115 immediately disposed thereabove with the surface 176 in firm engagement with and disposed essentially parallel with respect to the engaged surface 117 on the tooth 115. The position of the pawl 170 and the inclined position of the tooth surface 116 insures a firm maximum contact with the surfaces 116 and 176, thus to provide maximum holding therebetween. With the parts as illustrated in FIG. 10, the strap 101 is firmly grasped between the abutment wall 154 and the pawl 170, while the pawl tooth 175 is in firm locking engagement with the strap tooth 115 disposed immediately thereabove.

After installation of the cable tie 100 about the bundle 190, the cable tie 100 may be subjected to forces tending to move the strap 101 in a strap-withdrawal direction such as illustrated by the arrow 196 in FIG. 11, which forces are sufficient to place an ultimate load upon the parts, whereby to move the parts to the ultimate-load positions illustrated in FIG. 11. Under these conditions, the retrograde movement of the strap 101 has continued in the direction of the arrow 196 and the strap tooth 115 immediately above the pawl tooth 180 has moved downwardly into contact therewith, and the pawl 170 continues to rotate and shift until the stop member 185 is in abutment with the inner surface 161. More specifically, the hinge 171 tends to collapse and permit the lower end of the pawl 170 to shift to the right as viewed in FIG. 11 and to pivot in a counterclockwise direction about the hinge 171 until the abutment surface 186 on the stop member 185 bears against the inner surface 161, at which time the position of the pawl 170 becomes locked and further shifting and rotation is prevented, this being the ultimate-load position of the parts.

With the parts in this condition, the pawl tooth 180 is in firm engagement with the strap tooth 115 immediately disposed thereabove with the top surface 173 pressing against and disposed essentially parallel with respect to the engaged surface 116 on the tooth 115. The shifting of the pawl 170 and the inclined position of the tooth surface 116 insures a first maximum contact between the surfaces 116 and 173 thus to provide maximum holding therebetween. With the parts in the positions illustrated in FIG. 11, the strap 101 is firmly grasped between the abutment wall 154 and the pawl 170, while the pawl tooth 180 is in firm locking engagement with the strap tooth 115 disposed immediately thereabove and the pawl tooth 175 is likewise in firm locking engagement with the strap tooth 115 disposed immediately thereabove.

It is pointed out that in the described operation of the pawl 170, the pawl 170 never leaves the frame 130. More specifically, the pawl 170 in the as-molded position thereof as illustrated in FIG. 8 and in all other positions thereof including the fully flexed position of FIG. 9 and the tensioned position of FIG. 10, is disposed well within the frame 130 between the entry surface 112 and the exit surface 140 thereof. In other words, no part of the pawl 170 leaves the frame 130 during the application of cable tie 100 about the bundle 190. The channel in the front wall 151 provided by the surface 155 thereon and the inner surfaces 132 on the side walls 131 assists in the entry of the tip 102 into the throat 150 and also assists in permitting the frame 130 to lie more nearly flat against the associated bundle 190.

Once the parts are in the tensioned condition of the FIG. 10, any force tending to withdraw the strap 101 from within the throat 150 in a strap-withdrawal direction serves to move the teeth 175 and 180 on the pawl 170 into more firm engagement with the engaged ones of the teeth 115 on the strap 101, thereby firmly to grip the strap 101 between the front wall 151 and the pawl 170. The described action prevents inadvertent withdrawal of the strap 101 from the frame 130, thus to lock the strap 101 in its tensioned condition about the bundle of wires.

Referring to FIG. 11, it is pointed out that the crests of the teeth 175 and 180 define a plane which in the tensioned condition of the parts is disposed essentially parallel to the surface 154, the surface 154 extending beyond the tooth 180 toward the exit surface 140 and beyond the tooth 175 toward the entry surface 112, thereby to provide a backing for the engaged portion of the strap 101 so that the corresponding engaged teeth 115 are encompassed thereby.

Referring to FIG. 9, it will be noted that even at the full clockwise position of the pawl 170 with respect to the frame 130, there is ample clearance between the rear surface 174 of the pawl 170 and the inner surface 142 of the end wall 141, thereby to permit unrestricted flexure of the pawl 170 during insertion of the strap 101 into the frame 130. This feature is important to minimize damage to the tooth 175 on the pawl 170 and to prevent tearing of the pawl 170 from the frame 130 during the insertion of the strap 101 through the frame 130.

In a constructional example of the cable tie 100 for use with bundles having a diameter of 2 inches, the overall length thereof is 7.3 inches, the width of the strap 101 is 0.180 inch, the thickness of the strap 101 is 0.044 inch, the length of the tip 102 is 0.87 inch, the portion of the strap carrying the teeth 115 has a length of 5.68 inches, the depth of the teeth 115 is 0.012 inch and the pitch thereof is 0.04 inch, the inclination of surfaces 116 to the surface 112 being 4° and the inclination of the surfaces 117 to the surface 112 being 26°; the dimensions of the frame 130 in the direction of the strap 101 is 0.28 inch, the overall height of the frame 130 is 0.2 inch, the overall width of the frame 130 is 0.32 inch, the inclination of the surfaces 133, 143, and 153 is 5°, and the inclination of the surface 142 is 5°.

Figure 12:
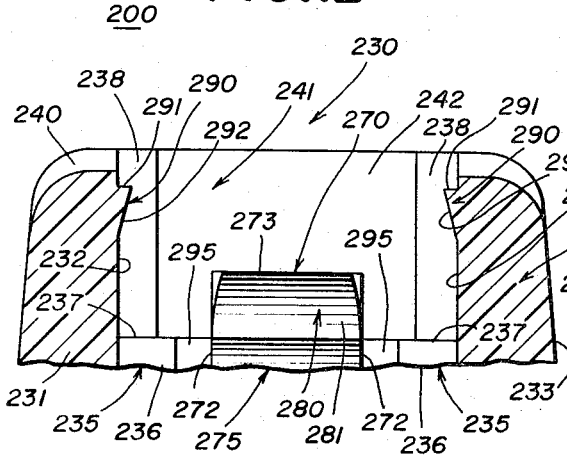
FIGS. 12 and 13 are fragmentary views in vertical section through a first modification of the cable tie of FIGS. 1 to 11 and illustrating ribs on the inner side walls of the frame to facilitate removal thereof from the mold therefor and webs between the pawl and the frame.
Figure 13:
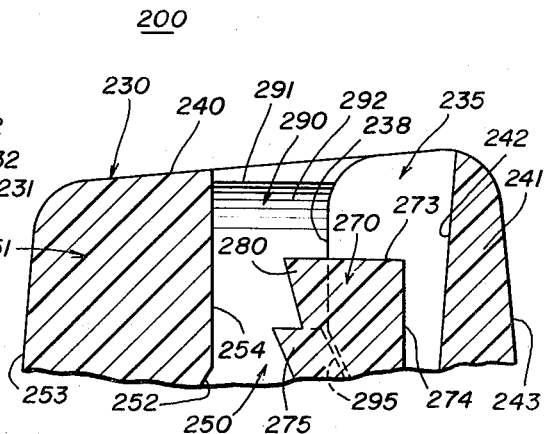

There is illustrated in FIGS. 12 and 13 of the drawings a second embodiment of an integral one-piece cable tie made in accordance with the present invention, the cable tie of FIGS. 12 and 13 being generally designated by the numeral 200. Many of the parts of the cable tie 200 are identical in construction to like parts of the cable tie 100 described above, and accordingly, there has been applied to each part of the cable tie 200 a reference numeral in the 200 series corresponding to the reference numeral in the 100 series that was applied to the like part of the cable tie 100 described above.

The form of the invention shown in FIGS. 12 and 13 differs from that shown in FIG. 1 to 11 in that there has been added thereto on each of the inner surfaces 232 a rib 290 extending into the opening in the frame 230, and webs 295 connecting the sides of the pawl 270 and the frame 230. Each rib 290 has an upper surface 291 disposed substantially parallel to the longitudinal axis of the strap as molded and an upwardly and inwardly inclined surface 292 joining the surface 291. The rib 290 assists in preferentially holding the frame 230 in the mold section forming the upper portion thereof as viewed in FIGS. 12 and 13 while the other mold section is removed therefrom, after which suitable knockout mechanism is utilized to remove the frame 230 and the other parts of the cable tie 200 from the associated mold member.

The webs 295 interconnect the sides 272 of the pawl 270 and the frame 230, and more specifically the inner sides of the frame 230 at the rails 235 thereof. The upper edges of the webs 295 terminate at the surfaces 237, and the webs 295 extend downwardly and to the right as viewed in FIG. 13 to the ledge (not illustrated) on which the pawl 270 is mounted, the ledge being like the ledge 160 described above. The webs 295 are most useful during the molding of the cable tie 200 in that the webs 295 assist in insuring proper removal of the pawl 270 from the mold portions therefor without injury to the pawl 270, yet the webs 295 do not materially interfere with the pivotal and shiftable motions of the pawl 270 necessary during strap insertion and tightening.

Figure 14:
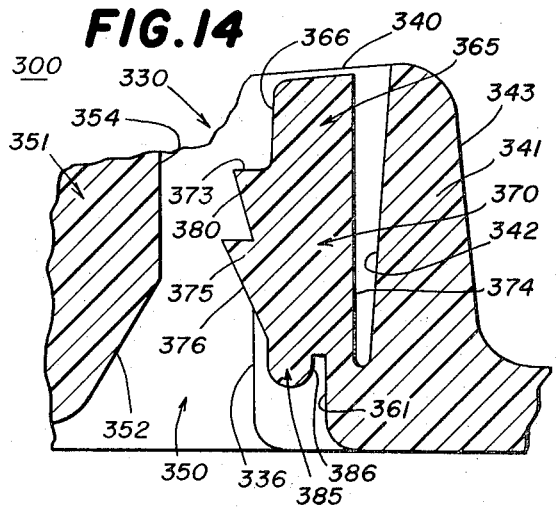
FIGS. 14 and 15 illustrate a second modification of the cable tie of FIGS. 1 to 11 wherein the rear of the pawl is positioned sufficiently close to the rear wall of the frame to be brought into contact therewith upon tensioning so as to limit rotation and pivoting of the pawl with respect to the frame during strap tensioning, and wherein an antirotation member is provided on the pawl.
Figure 15:
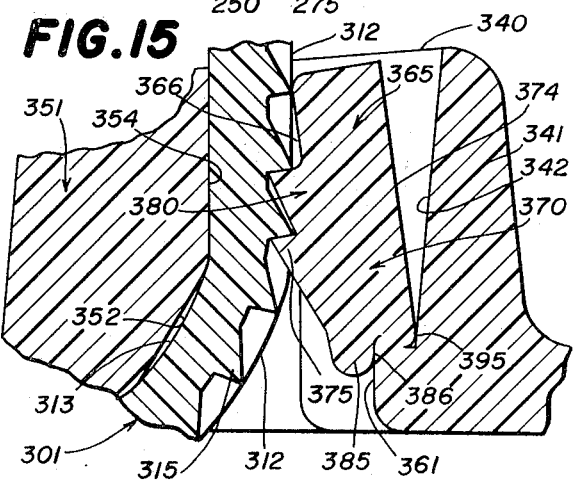

There is illustrated in FIGS. 14 and 15 of the drawings a third embodiment of an integral one-piece cable tie made in accordance with the present invention, the cable tie of FIGS. 14 and 15 being generally designated by the numeral 300. Many of the parts of the cable tie 300 are identical in construction to like parts in the cable tie 100 described above, and accordingly there has been applied to each part of the cable tie 300 a reference numeral in the 300 series corresponding to the reference numeral in the 100 series that was applied to the like part of the cable tie 100.

The fundamental difference between the cable tie 300 of FIGS. 14 and 15 and cable tie 100 described above is that the rear wall 374 of the pawl 370 is disposed closer to the inner surface 342 of the rear wall 341 of the frame 330. As a result, when the pawl 370 is pivoted and shifted downwardly and rearwardly, a portion 395 thereof contacts the surface 342, the portion 395 serving as a second stop member to limit the shifting of the pawl 370, the portion 395 cooperating with the stop member 385 in this action. In this regard, it is pointed out that the surface 386 on the stop member 385 is spaced from the surface 361 in the as-molded condition of the pawl 370 a predetermined distance, and the portion 395 on the pawl 370 is spaced from the surface 342 in the as-molded position of the pawl 370 a like distance. As a consequence, the first stop member 385 and the second stop member in the form of the portion 395 engage with the respective abutment surface essentially simultaneously when the pawl 370 reaches the ultimate-load position thereof illustrated in FIG. 15.

There also is provided upon the pawl 370 extending upwardly therefrom toward the exit surface of the frame 330 an anti-rotation member 365 having a surface 366 disposed toward the front wall 351. As is best seen in FIG. 15, when the parts reach the ultimate-load positions, the surface 366 engages the adjacent surface 312 of the strap 301, thereby positively to prevent further shifting and rotation of the pawl 370 in a counter-clockwise direction.

There is illustrated in FIGS. 16 and 17 of the drawings a fourth embodiment of an integral one-piece cable tie made in accordance with the present invention, the cable tie of FIGS. 16 and 17 being generally designated by the numeral 400. Many of the parts of cable tie 400 are identical in construction to like parts in the cable tie 100 described above, and accordingly there has been applied to each part of the cable tie 400 a reference numeral in the 400 series corresponding to the reference numeral in the 100 series that was applied to the like part of the cable tie 100.

The fundamental difference between the cable tie 400 of FIGS. 16 and 17 and cable tie 100 described above resides in the shape of the tip 402 thereon, the tip 402 having the longitudinal axis thereof as a continuation of the longitudinal axis of the strap 401 rather than being inclined thereto as is the tip 102 with respect to the strap 101. Furthermore, the ridges 420 extend outwardly essentially to the end 403, the ends 423 of the ridges 420 terminating only a short distance from the end 403. The surfaces 413 and 412 are parallel throughout the length of the strap 401 and the tip 402 until the ends 423 of the ridges 420 are reached. The parallel configuration of these surfaces facilitate grasping of the tip 402 by application tools during the application of the cable tie 400 about an associated bundle of wire.

In FIG. 18, there is illustrated a further novel feature of the present invention, which novel feature resides in the fact that the cable ties are molded in mold cavities that are supplied with molten plastic through portions thereof corresponding to the outer ends of the strap tips. More specifically, there is diagrammatically illustrated a mold cavity 500 including a portion 501 to mold the strap and a portion 530 to mold the frame. Molten plastic is fed under pressure through a passage 550 from an inlet 551 in the direction of the arrow 561 and then to a passage 552 feeding the mold cavity 500 in the direction of the arrow 562 and 563. The passage 552 connects with the end 503 of the cavity 501 for molding the strap. It will be appreciated that the cable tie, once molded, can be readily severed from the congealed plastic filling the passage 552. Any irregularities remaining on the end of the cable tie resulting from such severence is minimal and in any event, are normally discarded after application of the cable tie about a bundle of wires and the like, since the cable tie is ordinarily severed adjacent to the frame and the remaining portion extending beyond the frame and including the irregularities on the outer end of the strap is discarded.

Referring to FIGS. 19 to 27 of the drawings, there is shown a sixth preferred embodiment of an integral one-piece cable tie 600 made in accordance with and embodying the principles of the present invention. The cable tie 600 includes generally a strap 601 carrying on one end thereof a frame or head 630 having a strap-preceiving opening or throat 650 therethrough in which is disposed a pawl 670. The cable tie 600 is especially designed to be applied by hand without the use of any tool whatsoever to bind wires into bundles.

The strap 601 is elongated and flexible and includes a tip or end portion 602 which extends outwardly as viewed in FIG. 20 with respect to the remaining portion of the strap 601 as molded, the tip 602 having an outer end 603 which is slightly rounded and beveled as illustrated. The end portion 602 further has on the upper surface thereof as viewed in FIG. 20 a plurality of embossments 605 adapted to be grasped manually by a user to assist in initial installation of the cable tie 600 about a bundle.

The strap 601 further includes a pair of longitudinally extending strap sides 610 which extend the length of the strap 601, and an inner or bundleengaging surface 612 and an outer surface 613. Disposed in the surface 612 is a row of teeth 615 (see FIG. 23 also), the teeth 615 being disposed in a recessed position with respect to the surface 612 and extending laterally of the strap 601 and having a width slightly less than the width of the surface 612, whereby to be confined completely within the body of the strap 601. As illustrated, each of the teeth 615 has a shorter side 616 that is disposed at an acute angle with respect to a plane arranged transversely of the strap 601 and disposed perpendicular to the surface 612, the small acute angle in an illustrative example of the cable tie 600 being about 4°. Each of the teeth 615 also has a longer inclined side 617, the teeth being separated one from the other by flat surfaces 618 disposed substantially parallel to the surfaces 612 and 613 as molded.

The teeth 615 terminate a substantial distance away from the end 603 and the remaining portion of the underside of the strap is recessed as viewed in FIG. 20 providing an essentially flat surface 621 disposed between a pair of longitudinally extending ridges 620 disposed along the sides of the strap 602 and terminating in rounded ends 623 spaced only a short distance from the end 603. As illustrated, the ridges 620 have the inner facing surfaces thereof disposed apart a distance slightly greater than the width of the teeth 615, while the lowermost surfaces of the ridges 620 as viewed in FIG. 22 actually lie in the same plane as the strap inner surface 612. The thickness of the ridges 620, i.e., the distance between the surfaces 612 and 621, is essentially equal to the crest-to-root dimension of the teeth 615, and the thickness of the strap between the ridges 620, i.e., the distance between the surfaces 612 and 621, is equal to the distance between the flat surfaces 618 and the surface 613.

The frame 630 is integral with the strap 601 and comprises a pair of side walls or members 631, a rear wall or member 641 and a front wall or member 651. As may be best seen in FIG. 25, the side walls 631 are laterally spaced apart and include inner surfaces 632 that extend the full height of the frame 630 and are disposed essentially parallel to one another, the inner surfaces 632 more specifically extending from the inner surface 612 which serves as an entry surface for the frame 630 to an exit surface 640 on the top of the frame 630 as viewed in FIG. 25. The inner surfaces 632 further are spaced apart a distance greater than the distance between the strap sides 610, whereby the strap 601 may be received between the inner surfaces 632, all as will be explained more fully hereinafter. Each of the side walls 630 further includes an outer surface 633 that extends from the entry surface 612 to the exit surface 640.

Provided on each of the side walls 631 is a rail generally designated by the numeral 635, the rails 635 extending laterally inwardly toward one another. As illustrated, each of the rails 635 includes a guide surface 636 disposed essentially normal to the inner surface 632 and essentially normal to the entry surface 612, the guide surfaces 636 each terminating in a surface 637 disposed normal to the surfaces 636 and essentially parallel to the entry surface 612. The rails 635 serve to guide the strap 601 along a predetermined path through the frame 630, as will be explained more fully hereinafter.

The rear wall or end wall 641 includes an inner surface 642 and an outer surface 643, the inner surface 642 being rounded as best seen in FIG. 24 and sloping downwardly from the exit surface 640 toward the entry surface 612 and toward the pawl 670 and away from the outer surface 633, whereby the rear wall 641 is thicker at the bottom thereof than at the top thereof, all as illustrated in FIG. 26. The rails 635 merge into the rear wall 641 and the strap 601 is joined to the frame 630 at the lower and thicker portion of the rear wall 641.

The front wall or abutment wall 651 has an inner surface which includes a lower inclined surface 652 and an upper surface 654, both of which surfaces are spaced from the rear wall 631 in the direction opposite to the strap 601. The inclined surface 652 is inclined at an angle of about 58° with respect to the entry surface 612 toward the exit surface 640 and with respect to the longitudinal axis of the strap 601 as molded. The surface 654 on the other hand is disposed essentially normal to both the entry surface 612 and the longitudinal axis of the axis 601 as molded. The abutment wall 651 and the pawl 670 cooperate to provide therebetween a strap-receiving opening 650 that has the longitudinal axis thereof generally normal to the entry surface 612 and to the longitudinal axis of the strap 601 as molded. The front wall 651 also has an outer surface 653 that extends downwardly from the exit surface 640 and terminates a short distance away from the entry surface 612 and joins thereat a guide surface 635 which connects the inner surface 652 and the outer surface 653. More specifically, the guide surface 655 is spaced from the entry surface 612 and together with the inner surfaces 632 of the side walls 631 defines a strap-receiving channel in the frame 630. The channel thus provided in the frame 630 and beneath the front wall 651 permits the frame 630 to lie more closely against the associated bundle in the tensioned condition as illustrated in FIG. 27. It is noted that the exit surface 640 is parallel to the entry surface 612 and the longitudinal axis of the strap 601 as molded.

Extending between the rails 635 adjacent to the lower portion of the rear wall 641 is a ledge 660, the ledge 660 being essentially rectangular and directed toward the front wall 651 and disposed substantially parallel to the entry surface 612 and the central portion of the ledge 660 disposed toward the front wall 651.

Mounted within the strap-receiving opening 650 in the frame 630 is the pawl 670, the pawl 670 being connected to and mounted on the ledge 660 by means of a hinge 671, the hinge 671 being essentially rectangular in cross section. The pawl 670 has a pair of side surfaces 672 disposed substantially parallel to each other (see FIGS. 24 and 25), the side surfaces 672 being spaced apart a distance slightly less than the transverse dimension of the teeth 615 on the strap 601. The pawl 670 also has a top surface 673 (see FIG. 26) that is disposed substantially parallel to entry surface 612, the exit surface 640 and the axis of the strap 601 as molded, the surface 673 being flush with or just slightly below the exit surface 640. There also is provided a rear surface 674 which is formed as the arc of a cylinder, the rear surface 674 being disposed toward the rounded surface 642 on the rear wall 641. Two teeth 675 and 680 are provided on the surface of the pawl 670 disposed toward the front wall 651. The lower tooth 675 has a shorter side 676 disposed parallel to the top surface 673 and having a longer inclined side 677. The upper tooth 680 utilizes the top surface 673 as one of the sides thereof and also has an inclined side 681 that merges downwardly into the side 676 of the tooth 675. Referring to FIGS. 24 and 26, it will be seen that the crest of the tooth 675 is disposed forwardly or to the left as viewed in FIG. 26 toward the opposing abutment surface 654 with respect to the upper tooth 680, i.e., the crests of the teeth 675 and 680 lie in a plane that is inclined upwardly away from the opposed surface 654 in the as-molded position of the pawl 670 illustrated in FIG. 26. The crest-to-crest distance of the pawl teeth 675 and 680 is slightly less than the crest-to-crest distance of the strap teeth 615, whereby to insure that all of the teeth on the pawl 670 are positioned to engage teeth 615 on the strap 601, all as will be explained more fully hereinafter.

Disposed on the pawl 670 below the tooth 675 and forwardly with respect to the hinge 671 is a stop member 685. Referring to FIG. 25, it will be seen that the stop member 685 extends the entire width of the pawl 670, and referring to FIG. 26, it will be seen that the stop member 685 is essentially semi-cylindrical in shape and extends downwardly from the pawl 670 below the tooth 675 and in front of the inner surface 661. Disposed toward the surface 661 is an abutment surface 686 on the stop member 685, which abutment surface 686 is adapted to move toward and abut against the inner surface 661 when the cable tie 600 is under tension, whereby the stop member 685 serves to limit the pivoting and shifting of the pawl 670 under tension, all as will be explained more fully hereinafter.

In use, the cable tie 600 is manually encircled about a bundle of wires. Prior to such encirclement of the bundle, the frame 630 and the several parts associated therewith including the pawl 670 are in the positions shown in FIG. 26, i.e., in the as-molded condition thereof. It is noted that the crest of the tooth 675 is disposed forwardly to the left with respect to the crest of the tooth 680, and the abutment surface 686 is positioned from the inner surface 661 a short distance, which short distance is less than the closest distance between the rear surface 674 of the pawl 670 and the inner surface 642 of the rear wall 641 adjacent to the ledge 660.

The first step in applying the cable tie 600 about the bundle 690 is to insert the end portion 602 into the frame 630. It will be noted that the thickness of the end portion 602, except in the area of the embossments 605, is essentially equal to the distance between the surfaces 613 and 621 and is essentially equal to the distance between the abutment wall 654 and the crest of the pawl tooth 675, whereby the pawl tooth 675 is essentially undisturbed when the end portion 602 is inserted. After the end portion 602 is passed through the frame 630, the embossments 605 are grasped by the user to pull the strap through the frame 630 while the ridges 620 engage the rails 635 and specifically the guide surfaces 636 thereof. In passing, it is noted that the guide surfaces 636 of the rails 635 are positioned toward the abutment surface 654 as far as possible and essentially these surfaces 636 and 654 are spaced apart the thickness of the strap 601 in the area of the ridges 620 and the teeth 615.

Further movement of the strap 601 through the frame 630 will bring the strap teeth 615 into engagement with the lower pawl tooth 675. More specifically, engagement between the strap 601 and the pawl 670 is between the endmost one of the strap teeth 615 and the lower pawl tooth 675, such engagement pivoting the pawl 671 in a clockwise direction. During further tightening movement of the strap 601, the strap teeth 615 successively engage the pawl tooth 675, thereby to hold the pawl 670 generally in the clockwise pivoted position during movement of this portion of the strap 601 through the frame 630. It is pointed out that the upper pawl tooth 680 is not engaged by the strap 601, but is held out of engagement therewith due to the fact that the pawl tooth 675 extends toward the abutment surface 654 farther than does the pawl tooth 680. Preferably the strap 601 about the bundle is manually tightened about wires and the like as pointed out above.

After tightening of the strap 601, the user releases the end 602 and the tension in the portion of the strap 601 about the bundle tends to withdraw the strap 601 from the frame 630, i.e., in a retrograde or strap-withdrawal direction. During such movement of the strap 601 relative to the frame 630, the strap tooth 615 disposed immediately above the pawl tooth 675 engages the pawl tooth 675 and begins to shift and pivot the pawl 670 in a counterclockwise direction. As the retrograde movement of the strap 601 continues, the strap tooth 615 immediately above the pawl tooth 680 moves downwardly but does not engage the pawl tooth 680. Ultimately the parts arrive in the normal strap-locking positions thereof much like the corresponding positions of the parts in the cable tie 100 illustrated in page 10.

After installation of the cable tie 600 about a bundle, the cable tie 600 may be subjected to forces tending to move the strap 601 in a strap-withdrawal direction, which forces are sufficient to place an ultimate load upon the parts, whereby to move the parts to the ultimate-load position illustrated in FIG. 27. As the retrograde movement of the strap 601 continues, the strap tooth 615 immediately above the pawl tooth 680 moves into engagement therewith and the pawl continues to rotate and shift until the stop member 685 is in abutment with the inner surface 661. More specifically, the hinge 671 tends to collapse and permit the lower end of the pawl 670 to shift to the right as viewed in FIG. 27 and to pivot in a counterclockwise direction about the hinge 671 until the abutment surface 686 on the stop member 685 bears against the inner surface 661, at which time the position of the pawl 670 becomes locked and further shifting and rotation is prevented, this being the ultimate-load position of the parts.

With the parts in this condition, the pawl tooth 680 is in firm engagement with the strap tooth 615 immediately disposed thereabove with the top surface 673 pressing against and disposed essentially parallel with respect to the engaged surface 616 on the tooth 615. The shifting of the pawl 670 and the inclined position of the tooth surface 616 insures a firm maximum contact between the surfaces 616 and 673 thus to provide maximum holding therebetween. With the parts in the positions illustrated in FIG. 27, the strap 601 is firmly grasped between the abutment wall 654 and the pawl 670, while the pawl tooth 680 is in firm locking engagement with the strap tooth 615 disposed immediately thereabove and the pawl tooth 675 is likewise in firm locking engagement with the strap tooth 615 disposed immediately thereabove.

Once the parts are in the ultimate-load condition of FIG. 27, any force tending to withdraw the strap 601 from within the throat 650 in a strap-withdrawal direction serves to move the teeth 675 and 680 on the pawl 670 into more firm engagement with the engaged ones of the teeth 615 on the strap 601, thereby firmly to grip the strap 601 between the front wall 651 and the pawl 670. The described action prevents inadvertent withdrawal of the strap 601 from the frame 630, thus to lock the strap 601 in its ultimate-load condition about the bundle of wires.

Referring to FIG. 27, it is pointed out that the crests of the teeth 675 and 680 define a plane which in the ultimate-load condition of the parts is disposed essentially parallel to the surface 654, the surface 654 extending beyond the tooth 680 toward the exit surface 640 and beyond the tooth 675 toward the entry surface 612, thereby to provide a backing for the engaged portion of the strap 601 so that the corresponding engaged teeth 615 are encompassed thereby.

There is illustrated in FIG. 28 of the drawings a seventh embodiment of an integral one-piece cable tie made in accordance with the present invention, the cable tie of FIG. 28 being generally designated by the numeral 700. Many of the parts of the cable tie 700 are identical in construction to like parts of the cable ties 100 and 600 described above, and accordingly, there has been applied to each part of the cable tie 700 a reference numeral in the 700 series corresponding to the reference numeral in the 100 series or 600 series, as the case may be, that was applied to the like part of the cable tie 100 or the cable tie 600, as the case may be.

The fundamental difference between the cable tie 700 of FIG. 28 and the cable ties 100 and 600 described above resides in the provision of a release tab 790 integral with the upper end of the pawl 770. More specifically, the rear wall 774 of the pawl 770 is continued upwardly well above the exit surface 740 and there joins a forward wall 791 on the release tab 790, the wall 791 extending downwardly to the top surface 773 of the pawl 770.

When the pawl 770 is provided with the release tab 790, the user may manually release a tensioned cable tie 700 by manually pressing the release tab 790 in the direction of the arrow 795, (preferably accomplished by the fingernail of the user), and by manually pressing the portion of the strap 701 extending above the frame 730 in a direction of the arrow 796 (preferably with the first joint of the user's finger), whereby to shift the pawl 770 from the position of the pawls 170 and 670 in FIGS. 11 and 27, respectively, to the position illustrated in FIG. 28, in which position the pawl teeth 775 and 780 are moved out of engagement with the strap teeth 715. As a consequence, the strap 701 is now free to move in the direction of the arrows 707, i.e., in a retrograde direction with respect to the frame 730, thus to release the cable tie 700 with respect to the associated bundle of wires.

Referring to FIG. 27, there is diagrammatically illustrated therein by dashed lines an anti-rotation member 890 formed on the upper end of the pawl 670 and extending upwardly therefrom toward and beyond the exit surface 640. The member 890 has a surface 891 disposed toward the front wall 651 and in position to engage the adjacent surfaces 612 of the strap 601. Engagement of the anti-rotation member 890 with the strap 601 positively prevents further rotation and shifting of the pawl 670 in a counterclockwise direction as viewed in FIG. 27 when the parts are in the ultimate-load positions thereof.

From the above, it will be seen that there have been provided improved cable ties which fulfill all of the objects and advantages set forth above.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. An integral one-piece cable tie to be tensioned about a bundle of wires and the like, said cable tie comprising an elongated flexible strap, a row of first abutments disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strapbearing surface disposed toward said pawl and defining therewith a strap-receiving throat, at least one second abutment on said pawl arranged transversely with respect thereto and disposed toward said abutment wall and shaped to engage said row of first abutments on said strap, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strapreceiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

2. The integral one-piece cable tie set forth in claim 1, wherein said exit surface slopes toward said entry surface in a direction away from said strap.

3. The integral one-piece cable tie set forth in claim 1, wherein said exit surface is substantially parallel to said entry surface.

4. The integral one-piece cable tie set forth in claim 1, wherein said frame has a channel therein through said abutment wall for receiving the other end of said strap, thus to permit said frame to lie more nearly flat against the associated bundle of wires.

5. The integral one-piece cable tie set forth in claim 1, and further comprising two rails disposed in said frame on opposite sides of said pawl and having surfaces engaging said strap to guide said strap in a predetermined path through said frame, portions of said rails being disposed substantially parallel to said strap-bearing surface and spaced therefrom a distance equal substantially to the thickness of the portion of said strap carrying said first abutments.

6. The one-piece cable tie set forth in claim 1, wherein the end of said pawl disposed toward said exit surface is positioned a substantial distance away from said exit surface.

7. The integral one-piece cable tie set forth in claim 1, wherein the end of said pawl disposed toward said exit surface is positioned substantially flush therewith in the as-molded position of said pawl.

8. The integral one-piece cable tie set forth in claim 1, wherein the other end of said strap is substantially normal to the longitudinal axis of said strap as molded.

9. The integral one-piece cable tie set forth in claim 1, and further comprising a release tab integral with said pawl and extending therefrom beyond said exit surface in position to be engaged by the fingers of the user in all positions of said pawl.

10. The integral one-piece cable tie set forth in claim 1, and further comprising a resilient web interconnecting the sides of said pawl and the adjacent sides of said frame.

11. The integral one-piece cable tie set forth in claim 1, and further comprising an anti-rotation member on said pawl extending therefrom toward said exit surface and movable against the adjacent portion of said strap when said pawl is in the ultimate-load position thereof positively to prevent further shifting and rotation of said pawl.

12. An integral one-piece cable tie to be tensioned about a bundle of wires and the like, said cable tie comprising an elongated flexible strap, a row of abutments disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening, a hinge interconnecting said frame and the end of said pawl disposed toward said entry surface, said pawl being shiftable between an as-molded position disposed away from said abutment wall and strap-locking position and an ultimate-load position disposed toward said abutment wall, said abutment wall having a strap-bearing surface disposed toward said pawl and defining therewith a strap-receiving throat, a set of at least two teeth on said pawl arranged transversely with respect thereto and disposed toward said abutment wall and shaped to engage said row of abutments on said strap, the tooth disposed toward said entry surface being positioned in the as-molded position of said pawl closer to said strap-bearing surface than the tooth disposed toward said exit surface, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strapreceiving throat and through the opening in said frame and therebeyond, said row of abutments being disposed toward said pawl teeth as said strap is tensioned about the bundle of wires to a tensioned condition with the tooth disposed toward said entry surface successively engaging said abutments to pivot said pawl and to move said tooth disposed toward said exit surface out of engagement with said row of abutments, release of said strap causing at least one of said abutments firmly to engage said teeth and to shift said pawl about said hinge and to move said tooth disposed toward said exit surface into firm engagement with one of said abutments, any force tending to withdraw said strap from within said strap-receiving throat in a strap-withdrawal direction serving to move the associated one of said abutments into more firm engagement with said teeth firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

13. The integral one-piece cable tie set forth in claim 12, wherein the crest-to-crest distance of said pawl teeth is slightly less than the crest-to-crest distance of said row of abutments.

14. The integral one-piece cable tie set forth in claim 12, wherein said strap-bearing surface is disposed substantially normal to the longitudinal axis of said strap as molded.

15. The integral one-piece cable tie set forth in claim 12, and further comprising a release tab integral with said pawl and extending therefrom beyond said exit surface in position to be engaged by the fingers of the user in all positions of said pawl.

16. An integral one-piece cable tie to be tensioned about a bundle of wires and the like, said cable tie comprising an elongated flexible strap, a row of teeth disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening, a hinge interconnecting said frame and the end of said pawl disposed toward said entry surface, at least one tooth on said pawl arranged transversely with respect therewith and disposed toward said abutment wall and shaped to engage said row of teeth on said strap, the outer end portion of said strap having a thickness substantially equal to that of the distance between the roots of said strap teeth and the other longitudinal surface of said strap, and two ridges disposed respectively along the longitudinal edges of said one longitudinal surface of said strap and extending from adjacent to the strap tooth disposed away from said frame to a point adjacent to the outer end portion of said strap, said ridges having a thickness substantially equal to the crest-to-root thickness of said strap teeth, said strap being deformable into a loop encircling a bundle of wires with the free end of said strap extending into said strap-receiving throat and through the opening in said frame and therebeyond, said ridges being disposed toward said pawl on the opposite sides thereof and engaging portions of said frame to hold said strap out of engagement with said pawl tooth, said strap teeth being disposed toward said pawl tooth as said strap is tensioned about the bundle of wires to a tensioned condition, release of said strap causing at least one of said strap teeth firmly to engage said pawl tooth firmly to grip said strap between said strap-bearing surface and said pawl, any force tending to withdraw said strap from within said strap-receiving throat in a strap-withdrawal direction serving to move the engaged one of said strap teeth into more firm engagement with said pawl tooth more firmly to grip said strap between said strap-bearing surface and said pawl, whereby to prevent inadvertent withdrawal of said strap from said frame and thus to lock said strap in its tensioned condition about the bundle of wires.

17. The integral one-piece cable tie set forth in claim 16, wherein said ridges extend along said strap teeth.

18. The integral one-piece cable tie set forth in claim 16, wherein the outer end of said strap is substantially normal to the longitudinal axis of said strap.

19. The integral one-piece cable tie set forth in claim 16, and further comprising a release tab integral with said pawl and extending therefrom beyond said exit surface in position to be engaged by the fingers of the user in all positions of said pawl.

20. The integral one-piece cable tie as set forth in claim 16, wherein the outermost free end of said strap disposed away from said frame carries the only irregularity resulting from the connection point used during filling of the mold for molding said cable tie.

21. An integral one-piece cable tie to be tensioned about a bundle of wires and the like, said cable tie comprising an elongated flexible strap, a row of teeth disposed on one longitudinal surface of said strap and arranged transversely with respect thereto, a frame integral with one end of said strap and including an end wall and an abutment wall, said frame having an entry surface and exit surface and a strap-receiving opening extending therethrough, said end wall being substantially rounded in a direction parallel to the axis of the said strap-receiving opening, a pawl disposed within said frame in said strap-receiving opening and having a substantially rounded rear surface disposed toward said rounded end wall, a hinge interconnecting said frame and the end of said pawl disposed toward said entry surface, said pawl in the as-molded position thereof and in all other positions thereof including the tensioned position thereof being disposed entirely within said frame between the entry and exit surfaces thereof, said abutment wall having a strap-bearing surface disposed toward said pawl and defining therewith a strap-receiving throat, and at least one tooth on said pawl arranged transversely with respect thereto and disposed toward said abutment wall and shaped to engage said strap teeth, said strap being deformable into a loop encircling a bundle of wires with the free end of said strap extending into said strap-receiving throat and through the opening in said frame and therebeyond, said strap teeth being disposed toward said pawl tooth as said strap is tensioned about the bundle of wires to a tensioned condition, release of said strap causing at least one of said strap teeth firmly to engage said pawl tooth to grip said strap between said strap-bearing surface and said pawl, any force tending to withdraw said strap from within said strap-receiving throat in a strap-withdrawal direction serving to move said strap tooth into more firm engagement with the pawl tooth more firmly to grip said strap between said strap-bearing surface and said pawl, whereby to prevent inadvertent withdrawal of said strap from said frame and thus to lock said strap in its tensioned condition about the bundle of wires.

22. The integral one-piece cable tie set forth in claim 21, wherein said rounded rear surface of said pawl is shaped substantially as part of the surface of a cylinder.

23. The integral one-piece cable tie set forth in claim 21, and further comprising a release tab integral with said pawl and extending therefrom beyond said exit surface in position to be engaged by the fingers of the user in all positions of said pawl.

24. The integral one-piece cable tie set forth in claim 21, and further comprising a resilient web interconnecting the sides of said pawl and the adjacent sides of said frame.

25. An integral one-piece molded cable tie to be tensioned about a bundle of wires and the like, said cable tie comprising an elongated flexible strap, a row of teeth disposed on one longitudinal surface of said strap and arranged tranversely with respect thereto, a frame integral with one end of said strap and including an end wall and an abutment wall and opposed side walls, said frame having an entry surface and an exit surface and a strap-receiving opening extending therethrough, said frame side walls each having a rib extending therefrom into said strap-receiving opening to facilitate withdrawal of said cable tie from the mold therefor, a pawl disposed within said frame in said strap-receiving opening, a hinge interconnecting said frame and the end of said pawl disposed toward said entry surface, at least one tooth on said pawl arranged transversely with respect therewith and disposed toward said abutment wall and shaped to engage said row of teeth on said strap, said strap being deformable into a loop encircling a bundle of wires with the free end of said strap extending into said strap-receiving throat, and through the opening in said frame and therebeyond, said strap teeth being disposed toward said pawl tooth as said strap is tensioned about the bundle of wires to a tensioned condition, release of said strap causing at least one of said stop teeth firmly to engage said pawl tooth firmly to grip said strap between said strap-bearing surface and said pawl, any force tending to withdraw said strap from within said strap-receiving throat in a strap-withdrawal direction serving to move the engaged one of said strap teeth into more firm engagement with said pawl tooth more firmly to grip said strap between said strap-bearing surface and said pawl, whereby to prevent inadvertent withdrawal of said strap from said frame and thus to lock said strap in its tensioned condition about the bundle of wires.

26. An integral one-piece cable tie to be tensioned about a bundle of wires and the like, said cable tie comprising an elongated flexible strap, a row of first abutments disposed on one longitudinal surface of said strap and arranged transversely with respect thereto, a frame integral with one end of said strap and including a rear wall and an abutment wall, said frame having an entry surface and an exit surface and a strap-receiving opening extending therethrough, a pawl disposed within said frame in said strap-receiving opening and having a rear wall disposed toward said frame rear wall, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, a first stop member on said pawl extending toward said entry surface and spaced from said frame in the as-molded position of said pawl and abutting against said frame in the ultimate-load position of said pawl, and a second stop member on one of said rear walls extending toward the other of said rear walls and spaced therefrom in the as-molded position of said pawl and abutting thereagainst in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned abount the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said first stop member against said frame and moving said second stop member against said other rear wall, whereby to prevent inadvertent withdrawal of said strap from said frame and thus to lock said strap in its tensioned condition about the bundle of wires.

27. The integral one-piece cable tie set forth in claim 26, wherein the space between said first stop member and said frame in the as-molded position of said pawl is substantially equal to the space between said second stop member and the other of said rear walls in the as-molded position of said pawl.

28. The integral one-piece cable tie set forth in claim 26, and further comprising a release tab integral with said pawl and extending therefrom beyond said exit surface in position to be engaged by the fingers of the user in all positions of said pawl.

29. An integral one-piece molded cable tie to be tensioned about a bundle of wires and the like, said cable tie comprising an elongated flexible strap, a row of first abutments disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening, a hinge interconnecting said frame and the end of said pawl disposed toward said entry surface, said abutment wall having a strap-bearing surface disposed toward said pawl and defining therewith a strap-receiving throat, and at least one second abutment on said pawl arranged transversely with respect thereto and disposed toward said abutment wall and shaped to engage said row of first abutments on said strap, the outermost free end of said strap disposed away from said frame carrying the only irregularity resulting from the connection point used during filling of the mold for molding said cable tie, said strap being deformable into a loop encircling a bundle of wires with the free end of said strap extending into said strap-receiving throat and through the opening in said frame and therebeyond, any irregularity on the outermost end of said strap being so positioned as to cause no interference with normal operation of the cable tie, said row of first abutments being disposed toward said second abutment as said strap is tensioned about the bundle of wires to a tensioned condition, release of said strap causing at least one of said first abutments firmly to engage said second abutment and to place the outermost end of said strap carrying any irregularity to position to be severed, any force tending to withdraw said strap from within said strap-receiving throat in a strap-withdrawal direction serving to move the associated one of said first abutments into more firm engagement with said second abutment more firmly to grip said strap between said strap-bearing surface and said pawl, whereby to prevent inadvertent withdrawal of said strap from said frame and thus to lock said strap in its tensioned condition about the bundle of wires.

30. The integral one-piece molded cable tie set forth in claim 29, and further comprising a release tab integral with said pawl and extending therefrom beyond said exit surface in position to be engaged by the fingers of the user in all positions of said pawl.

31. The integral one-piece molded cable tie set forth in claim 29, wherein the outer end of said strap is essentially normal to the longitudinal axis of said strap and carries said irregularity.

32. An integral one-piece cable tie to be tensioned about a bundle of wires and the like, said cable tie comprising an elongated flexible strap, a row of first abutments disposed on one longitudinal surface of said strap and arranged transversely with respect thereto, a frame integral with one end of said strap and including an end wall and an abutment wall and opposed side walls, said frame having an entry surface and an exit surface and a strap-receiving opening extending therethrough, a pawl disposed within said frame in said strap-receiving opening and having two side walls disposed respectively adjacent to said frame side walls, a hinge interconnecting said end wall and the end of said pawl disposed toward said entry surface, a resilient web interconnecting the sides of said pawl and the adjacent side walls of said frame, said abutment wall having a strap-bearing surface disposed toward said pawl and defining therewith a strapreceiving throat, and at least one second abutment on said pawl arranged transversely with respect thereto and disposed toward said abutment wall and shaped to engage said row of first abutments on said strap, said strap being deformable into a loop encircling a bundle of wires with the free end of said strap extending into said strap-receiving throat and through the opening in said frame and therebeyohd, said row of first abutments being disposed toward said second abutment as said strap is tensioned about the bundle of wires to a tensioned condition, release of said strap causing at least one of said first abutments firmly to engage said second abutment, any force tending to withdraw said strap from within said strap-receiving throat in a strap-withdrawal direction serving to move the associated one of said first abutments into more firm engagement with said second abutment more firmly to grip said strap between said strap-bearing surface and said pawl, whereby to prevent inadvertent withdrawal of said strap from said frame and thus to lock said strap in its tensioned condition about the bundle of wires.

33. The integral one-piece cable tie set forth in claim 32 and further comprising a release tab integral with said pawl and extending therefrom beyond said exit surface in position to be engaged by the fingers of the user in all positions of said pawl.

34. The integral one-piece cable tie set forth in claim 32, wherein said end wall is integral with the adjacent end of said strap and said first abutments are disposed on the surface of said strap adapted to be disposed against a bundle of wires and the like in use.

35. An integral one-piece cable tie to be tensioned about a bundle of wires and the like, said cable tie comprising an elongated flexible strap, a row of first abutments disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, and an anti-rotation member on said pawl extending toward said exit surface and spaced from said frame in the as-molded position of said pawl and abutting against the adjacent portion of said strap in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strapbearing surface and said pawl, application of a force to said strap in a strap-withdrawal direction sufficient to shift said pawl to the ultimate-load position thereof moving said anti-rotation member against the adjacent portion of said strap to limit the shifting of said pawl, whereby to prevent inadvertent withdrawal of said strap from said frame and thus to lock said strap in its tensioned condition about the bundle of wires.

36. A cable tie to be tensioned about a bundle of wires and the like, said cable tie comprising an elongated flexible strap, a row of first abutments disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

37. A cable tie to be tensioned about a bundle of wires and the like, said cable tie comprising an elongated flexible strap, a row of abutments disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, a set of at least two teeth on said pawl arranged transversely with respect thereto and disposed toward said abutment wall and shaped to engage said row of abutments on said strap, the tooth disposed toward said entry surface being positioned in the as-molded position of said pawl closer to said strap-bearing surface than the tooth disposed toward said exit surface, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of abutments being disposed toward said pawl teeth as said strap is tensioned about the bundle of wires to a tensioned condition with the tooth disposed toward said entry surface successively engaging said abutments to pivot said pawl and to move said tooth disposed toward said exit surface out of engagement with said row of abutments, release of said strap causing at least one of said abutments firmly to engage said teeth and to shift said pawl about said hinge and to move said tooth disposed toward said exit surface into firm engagement with one of said abutments, any force tending to withdraw said strap from within said strap-receiving throat in a strap-withdrawal direction serving to move the associated one of said abutments into more firm engagement with said teeth firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

38. A cable tie to be tensioned about a bundle of wires and the like, said cable tie comprising an elongated flexible strap, a row of first abutments disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, and an anti-rotation member on said pawl extending toward said exit surface and spaced from said frame in the as-molded position of said pawl and abutting against the adjacent portion of said strap in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said anti-rotation member against the adjacent portion of said strap to limit the shifting of said pawl, whereby to prevent inadvertent withdrawal of said strap from said frame and thus to lock said strap in its tensioned condition about the bundle of wires.

39. A cable tie to be tensioned about a bundle of wires and the like, said cable tie comprising an elongated flexible strap, a row of first abutments disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a ledge on said end wall extending longitudinally therefrom toward said abutment wall and including a support surface disposed toward said entry surface, a pawl disposed within said frame in said strap-receiving opening and pivotally mounted on and integral with the support surface of said ledge, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

40. A cable tie to be tensioned about a bundle of wires and the like, said cable tie comprising an elongated flexible strap, a row of first abutments disposed on the longitudinal surface of said strap that is disposed against the bundle of wires in use, said abutments being arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, at least one second abutment on said pawl arranged transversely with respect thereto and disposed toward said abutment wall and shaped to engage said row of first abutments on said strap, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of first abutments being disposed toward said second abutment as said strap is tensioned about the bundle of wires to a tensioned condition, release of said strap causing at least one of said first abutments firmly to engage said second abutment and to shift said pawl to the strap-locking position thereof, any force tending to withdraw said strap from within said strap-receiving throat in a strap-withdrawal direction serving to move the associated one of said first abutments into more firm engagement with said second abutment firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

41. A cable tie to be tensioned about a bundle of wires and the like, said cable tie comprising an elongated flexible strap, a row of abutments disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening, a hinge interconnecting said frame and the end of said pawl disposed toward said entry surface, said pawl being shiftable between an as-molded position disposed away from said abutment wall and a strap-locking position and an ultimate-load position disposed toward said abutment wall, said abutment wall having a strap-bearing surface disposed toward said pawl and defining therewith a strap-receiving throat, a set of teeth on said pawl arranged transversely with respect thereto and disposed toward said abutment wall and shaped to engage said row of abutments on said strap, and a stop member on said pawl extending toward said entry surface and spaced from said frame in the as-molded position of said pawl and abutting against said frame in the ultimate-load position of said pawl, said strap being deformable into a loop encircling a bundle of wires with the free end of said strap extending into said strap-receiving throat and through the opening in said frame and therebeyond, said row of abutments being disposed toward said set of teeth as said strap is tensioned about the bundle of wires to a tensioned condition, release of said strap causing at least certain ones of said abutments firmly to engage said set of teeth and to shift said pawl to the strap-locking position thereof, any force tending to withdraw said strap from within said strap-receiving throat in a strap-withdrawal direction serving to move the associated ones of said abutments into more firm engagement with said teeth firmly to grip said strap between said strap-bearing surface and said pawl, application of a force to said strap in a strap-withdrawal direction sufficient to shift said pawl to the ultimate-load position thereof moving said stop member against said frame to limit the shifting of said pawl, whereby to prevent inadvertent withdrawal of said strap from said frame and thus to lock said strap in its tensioned condition about the bundle of wires.

* * * * *

UNITED STATES PATENT OFFICE
CERTIFICATE OF CORRECTION

PATENT NO. : 3,872,547
DATED : March 25, 1975
INVENTOR(S) : Jack E. Caveney and Roy A. Moody It is certified that error appears in the above-identified patent and that said Letters Patent are hereby corrected as shown below:

Column 1, line 47, delete "one" second occurrence;

Column 3, line 61, "FIG!" should be --FIGS.--;

Column 6, line 54, "opening" should be --opposing--;

line 66, "and" should be --with--;

Column 8, line 65, "first" should be --firm--;

Column 11, line 7, "surface" should be --surfaces--;

Column 18, line 37, after "The" insert --integral--; and

Column 24, line 22, "beyohd" should be --beyond--

Signed and sealed this 27th day of May 1975.

(SEAL)
Attest:

RUTH C. MASON
Attesting Officer

C. MARSHALL DANN
Commissioner of Patents
and Trademarks